United States Patent

Huppke

[11] 3,963,463
[45] June 15, 1976

[54] FOAM SCRUBBER
[75] Inventor: Glen P. Huppke, Land O Lakes, Fla.
[73] Assignee: Environeering, Inc., Skokie, Ill.
[22] Filed: Apr. 17, 1972
[21] Appl. No.: 244,890

Related U.S. Application Data

[63] Continuation-in-part of Ser. No. 190,893, Oct. 20, 1971, abandoned.

[52] U.S. Cl. .................................. 55/178; 55/186; 55/228; 55/233
[51] Int. Cl.² ........................................ B01D 53/14
[58] Field of Search ............. 55/87, 73, 89, 90, 178, 55/184–186, 190, 228, 233, 235

[56] References Cited
UNITED STATES PATENTS

| | | | |
|---|---|---|---|
| 2,740,609 | 4/1956 | Richardson et al. | 55/257 |
| 3,018,843 | 1/1962 | Mercier | 55/400 X |
| 3,155,472 | 11/1964 | Huppke | 55/178 |
| 3,231,251 | 1/1966 | Scheibel | 55/178 |
| 3,405,508 | 10/1968 | Peters et al. | 55/73 |
| 3,653,186 | 4/1972 | McLendon | 55/223 |

Primary Examiner—Charles N. Hart
Attorney, Agent, or Firm—Mason, Kolehmainen, Rathburn & Wyss

[57] ABSTRACT

A foam scrubber for removing contaminants from gas comprising first means for entrapping small, discrete volumes of said gas within liquid film enclosures comprising a mass of foam bubbles. Means for maintaining said foam bubbles a selected maximum size and for a selected interval of soaking time permitting the contaminants within the bubbles to diffuse and become entrapped within the surrounding liquid film of the bubbles. Means for collapsing the foam bubbles after the soaking period and separating the contaminant containing liquid thereof from the cleansed gas.

9 Claims, 6 Drawing Figures

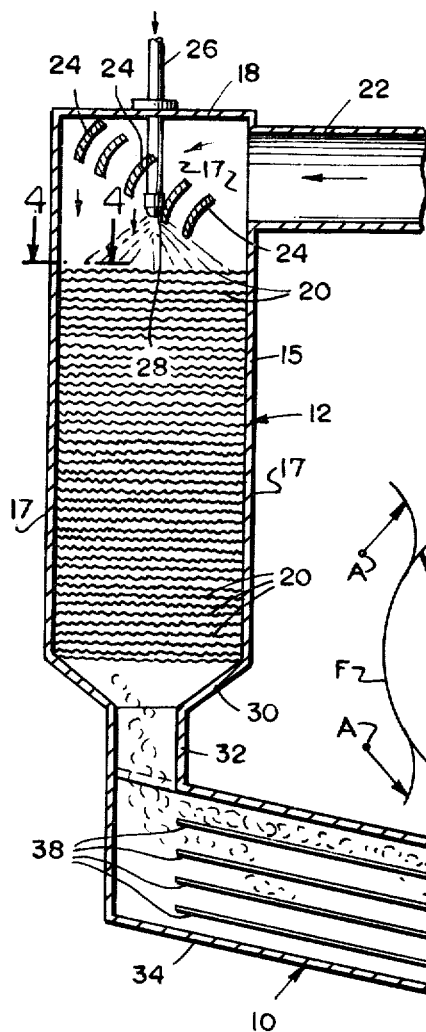
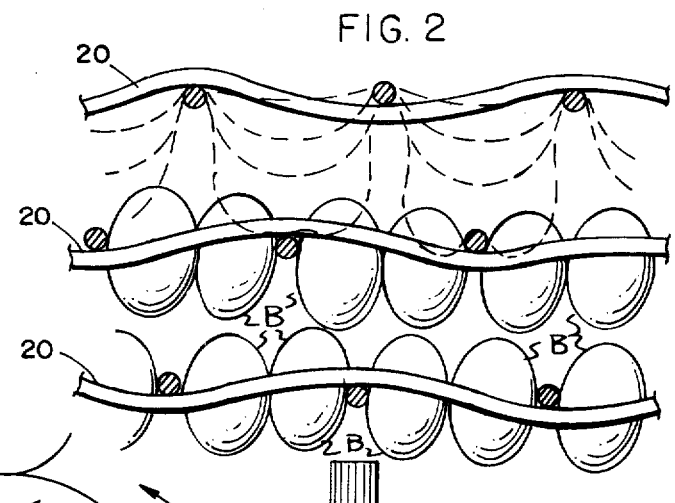
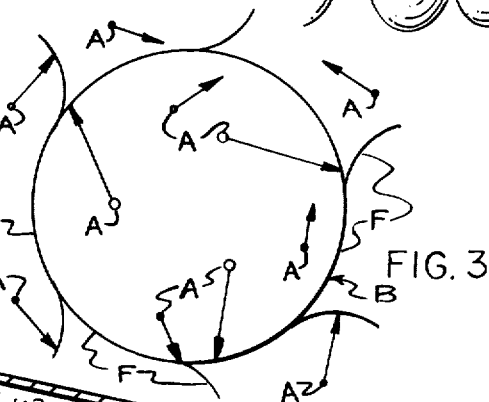
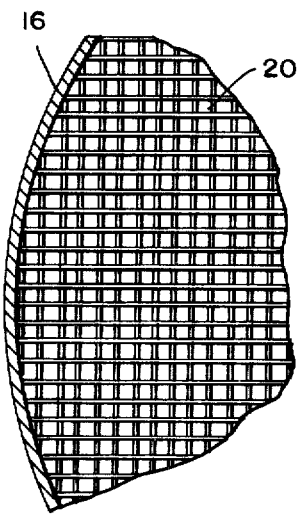
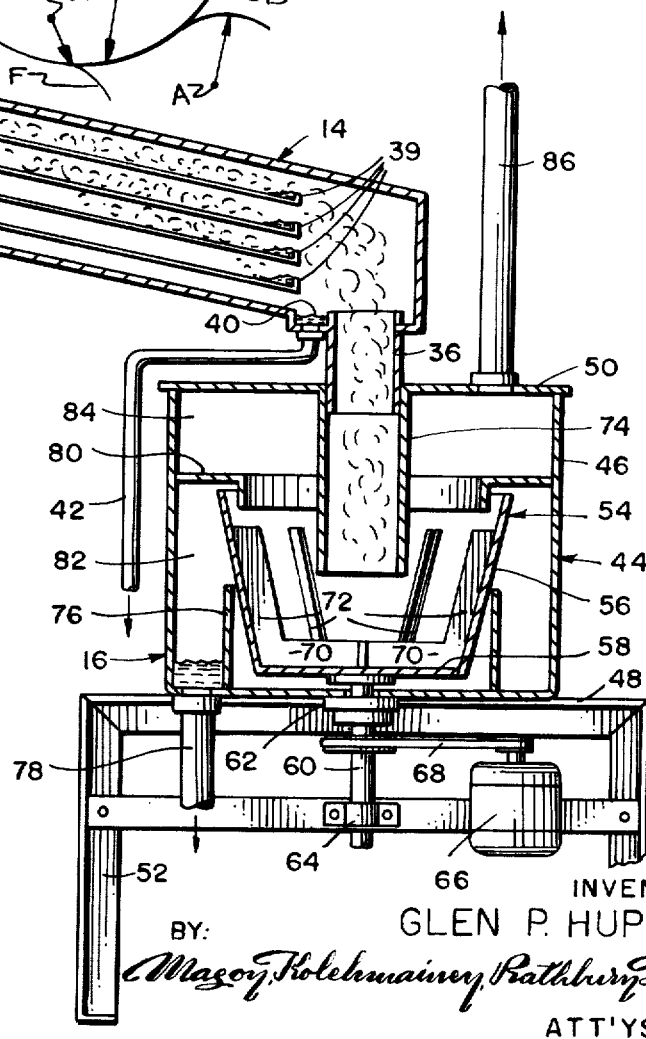
FIG. 1  FIG. 2  FIG. 3  FIG. 4
INVENTOR:
GLEN P. HUPPKE

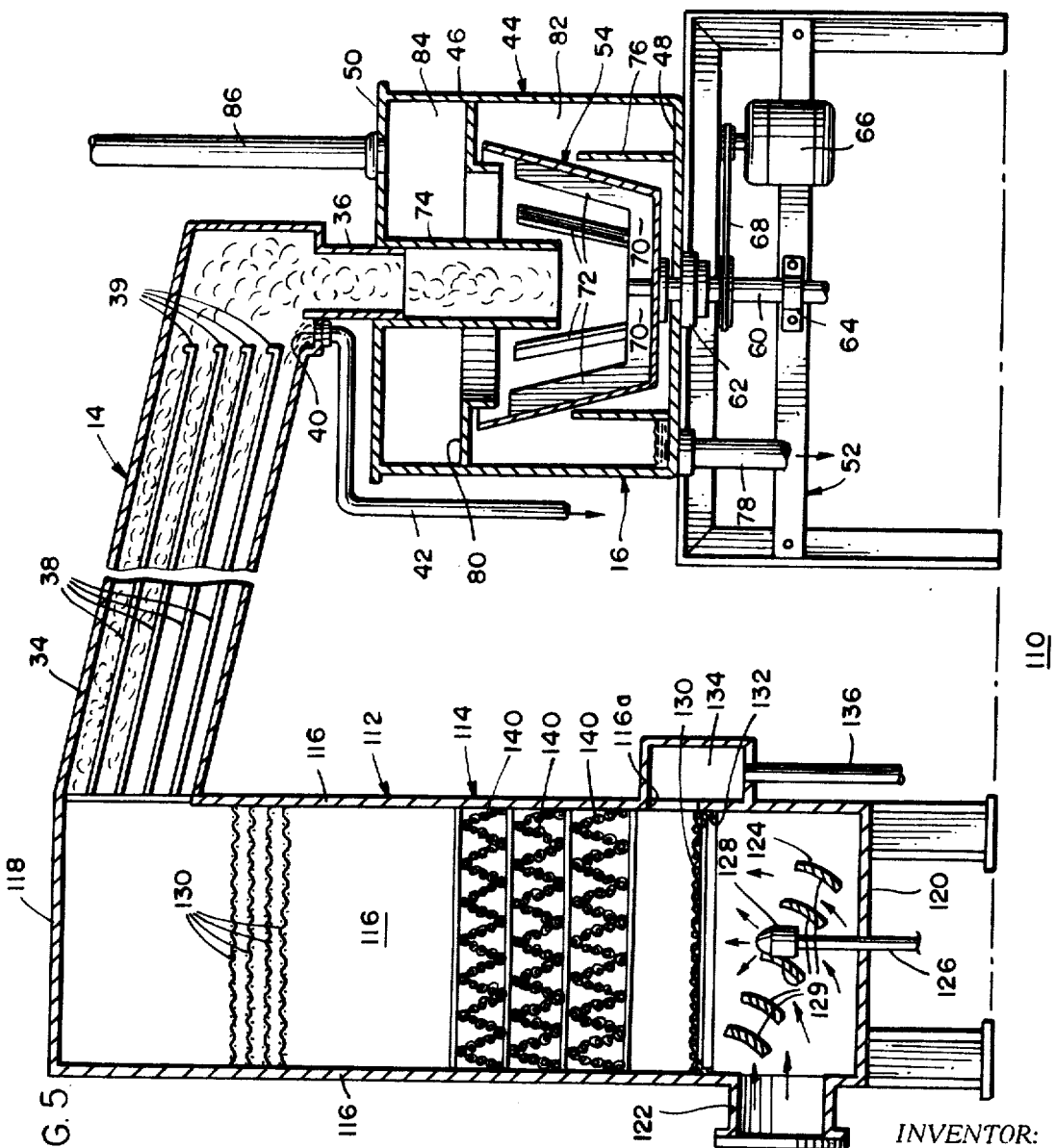

FOAM SCRUBBER

This application is a continuation-in-part of the copending U.S. patent application Ser. No. 190,893, filed Oct. 20, 1971 and now abandoned.

The present invention is directed towards a new and improved foam scrubber and a method of cleaning industrial gases and the like. The present invention employs a large mass of small size foam bubbles in which the gases to be treated are entrapped. During a period of entrapment or envelopment of the gas in the bubbles, the liquid film which forms the foam bubbles collects the contaminants in the gas by a diffusion process and the contaminants are collected into the liquid film which is then separated from the gas as the bubbles are collapsed. Foam scrubbers employing a large volume or mass of small size foam bubbles offer many advantages over other types of wet gas scrubbing equipment. For example, when the foam bubbles are small in size an extremely large surface area of liquid is provided per unit volume of gas in order to present a maximum surface area for absorbing the contaminants from the gases. One problem with foam-type gas scrubbers is in maintaining the foam in a stable condition and with a minimum bubble size for a desired soaking period or interval of time so that the contaminants within the gases will have enough time to diffuse and collect in the liquid film making up the foam bubble. Another problem associated with the former is that when a stable foam is achieved means must be provided for effectively breaking down or collapsing a high volume flow rate of the foam in order to separate the cleansed gas from the contaminated liquid. It is also a problem to efficiently handle a large volume flow rate of foam with equipment and components of relatively small size.

Gas scrubbers of the wet foam-type, as described, which utilize a gas entrapment or enclosure principal wherein a plurality of minute or small-size foam bubbles are highly effective in removing small-size contaminant particles. The foam bubbles envelop and entrap small, discrete volumes of the contaminated gas and it is believed that the small-size impurities in the gas act more like molecules than particles of matter and behave more in accordance with Brownian molecular theory than they do as physically discrete particles responding according to the physical laws of inertia and gravity. It is believed that when a large number of small, discrete gas volumes are entrappped within a mass of liquid film bubbles, the presence of a rather large surface area of liquid film per unit gas volume and because of the absence of buoyant gas flow velocities within each bubble, almost all of the small-size impurities are collected by the liquid film. The impurities in the gas move like molecules and eventually are transferred into the liquid film in a diffusion process which takes a considerable period of time (called, for example, a soaking period) to insure that all of the contaminants are removed. If the period of soaking is long enough, substantially all of the nongaseous as well as other impurities in the industrial gas to be cleaned are absorbed and diffused into the liquid surface and carried away upon collapse of the bubbles.

In some wet scrubbing installations used in connection with fuel burning equipment wherein coal or other fuels having appreciable amounts of sulphur is burned, there has been difficulty in removing sulphur oxides from the final exhaust or stack gases discharged to the atmosphere. Many prior art wet scrubbers have been unable to successfully remove these objectionable stack gas components, particularly sulphur dioxide, unless the scrubbers are operated at extremely high pressure drops and even then complete success is elusive. One proposed method of treatment is to inject ammonia into the gas or into the scrubbing liquid but this has resulted oftentime in the formation of a visible exhaust plume which is extremely difficult to remove by wet scrubbers of the prior art. The plume is believed to include submicronic particles of ammonium sulphite [$(NH_4)_2 \ SO_3$] which particles, although soluble in water to some extent are difficult to remove by conventional wet scrubbers. Other compounds may also be formed by the combination of ammonia and oxides of sulphur and until the present invention no economically feasible method of removal of the plume was available. Moreover, no effective wet scrubbers were available to remove the objectionable material from the gases except by operating the scrubbers at extremely high pressure drops with the attendant disadvantages of high operating costs and maintenance costs.

It is therefore an object of the present invention to provide a new and improved wet, foam-type, gas scrubber.

Another object of the invention is to provide a new and improved method of removing contaminants from gas.

More particularly, it is an object of the present invention to provide a new and improved, highly efficient method of removing contaminants of extremely small average size from industrial gases and the like.

It is another object of the present invention to provide a new and improved foam scrubber which employs a plurality or mass of relatively small-size, liquid foam bubbles which entrap and envelop discrete volumes of the gas and collect the contaminants from the gas in a diffusion process.

Yet another object of the present invention is to provide a new and improved foam scrubber of the character described which is efficient in operation and which is operable at a reasonable cost in terms of energy expended and cleaning efficiency achieved.

Another object of the present invention is to provide a new and improved foam scrubber having a smaller physical size than heretofore possible, yet able to provide an extremely high ratio of liquid film on surface area per unit volume of gas being treated.

Another object of the present invention is to provide a new and improved foam scrubber of the character described having new and improved foam generating means therein.

Another object of the present invention is to provide a new and improved foam scrubber of the character described having new and improved means for handling large volumes of foam and for breaking up or collapsing the same and separating the cleansed gas from the contaminated liquid of the foam.

Another object of the present invention is to provide a new and improved foam scrubber having means for generating a stable foam with a minimum of energy expended and with a minimum of liquid required, yet still providing an extremely high ratio of liquid surface area per unit volume of gas.

Another object of the present invention is to provide a new and improved method of removing contaminants from industrial gases and the like employing foam bubbles formed of liquid hydrocarbons and the like, rather than water or mixtures including water, thus eliminating moisture as a scrubbing liquid.

Still another object of the present invention is to provide a new and improved method and apparatus for removing contaminants from gas wherein foam bubbles are generated and maintained at a minimum average size in order to provide a maximum ratio of liquid surface area per unit volume of gas being treated.

Still another object of the present invention is to provide a new and improved foam scrubber wherein foam bubbles are created and retained at small size for a selected interval of time or a desired useful time life and are then collapsed with a minimum amount of energy being required for collapsing and breaking up the foam bubbles at the end of the time period.

Still another object of the present invention is to provide a new and improved wet foam gas scrubber wherein the gas is soaked in small, discrete, liquid film bubbles for a selected period of time, affording opportunity for the contaminant particles to leave the gas and collect in the liquid film.

Yet another object of the present invention is to provide a new and improved foam scrubber of the character described wherein size growth of the foam bubbles is controlled to maintain a small, average bubble size in order to provide maximum surface liquid area exposed to the entrapped gases therein.

Another object of the present invention is to provide a new and improved foam scrubber of the character described wherein a minimum pressure drop or energy requirement is needed between the time of foam generation and foam collapsing to move the gases through the scrubbing process.

Another object of the present invention is to provide a new and improved method of cleaning contaminanted gas capable of removing an extremely high percentage of the contaminants in the gas, especially those contaminants having an average size of one micron or less.

Another object of the present invention is to provide a new and improved method of removing contaminated gas wherein the gas is entrapped in a plurality of mass of small-size liquid film, foam bubbles, which bubbles are subsequently divided to maintain a selected maximum bubble size as the gases are treated in the process.

Another object of the invention is to provide a new and improved method of efficiently removing oxides of sulphur from industrial gases and the like.

Yet another object of the invention is to provide a new and improved method of removing oxides of sulphur from industrial gas and the like wherein ammonia is introduced into the process and wet foam scrubbing action is provided to remove substantially all of the combinations of ammonia and oxides of sulphur.

Still another object of the invention is the provision of a new and improved gas cleaning process including the addition of ammonia to the gas wherein the visible plumes are eliminated, yet the process is economically sound from an operating cost and maintenance cost standpoint.

A further object of the invention is to provide a new and improved gas cleaning method wherein ammonia is introduced into the process and subsequently the gas is entrapped in minute liquid foam bubbles for a soaking period to absorb substantially all of the compounds or combinations formed between the ammonia and the oxides of sulphur or other impurities in the gas being cleaned.

The foregoing objects and advantages of the present invention are accomplished in a new and improved method of removing small-size contaminant particles and fumes from industrial gases and the like, which method comprises the steps of forming a plurality or mass of liquid film foam bubbles to enclose and envelop small, discrete volumes of gas. The bubble size is maintained small during the process to provide a high ratio of liquid film surface area per unit volume of gas. The gas is entrapped in the bubbles of the foam mass for a selected period of time or soaking interval in order to provide ample time for diffusion of the small-size contaminants in the gas into the liquid film of the foam bubbles. The foam bubbles are then broken or collapsed to release the cleansed gas and separate the contaminated liquid therefrom.

In accordance with another feature of the present invention, a new and improved method of scrubbing industrial gases and the like containing oxides of sulphur includes the additional slips of introducing ammonia into the gas and entrapping compounds or combinations of ammonia and oxides of sulphur in the liquid film foam bubbles during a selected soaking period or interval as described in the preceding paragraph.

In accordance with the present invention, a new and improved wet foam gas scrubber includes foam generator means forming a mass of small-size liquid foam bubbles for entrapping and enveloping small, discrete volumes of the gas. Means is provided for maintaining the foam bubbles in controlled maximum size for a selected soaking interval of time in order to permit diffusion of the contaminants from the gas into the liquid film. Means is provided for breaking down or collapsing the foam bubbles after the soaking interval and separating the liquid from the cleansed gas.

For a better understanding of the invention, reference should be had to the following detailed description taken in conjunction with the drawings, in which:

FIG. 1 is a vertical, sectional view of a foam scrubber apparatus constructed in accordance with the features of the present invention;

FIG. 2 is a fragmentary, enlarged, sectional view illustrating in somewhat animated form a process of foam generation and bubble-size maintenance in accordance with the invention;

FIG. 3 is a schematic diagram illustrating in animated form a contaminant diffusion process wherein the contaminants in the gas, acting in accordance with Browian theory, are diffused and collected in the liquid film of the foam bubbles;

FIG. 4 is a fragmentary, enlarged, sectional view looking downwardly in the direction of arrows 4—4 of FIG. 1;

FIG. 5 is a vertical, sectional view of another embodiment of foam scrubber apparatus constructed in accordance with the features of the present invention; and FIG. 6 is an enlarged, fragmentary view showing in somewhat animated form the process of foam generation and bubble-size maintenance in accordance with the invention.

Referring now more particularly to the drawings and the embodiment illustrated in FIGS. 1 to 4, inclusive, therein is illustrated a new and improved wet foam gas scrubber constructed in accordance with the features of the present invention and referred to generally by the reference numeral 10. The foam scrubber 10 includes a foam generating unit generally indicated as 12, a gas soaking chamber 14, and a foam collapsing or breaker unit and gas/liquid separator generally indicated by the reference numeral 16.

The foam generator 12 includes an upright housing 15 having vertical sidewalls 17, a top wall 18, and a plurality of vertically stacked, horizontal screens 20 extending transversely across the housing between the housing sidewalls 17. Contaminated gas to be cleaned is introduced into the upper end of the housing through an inlet supply duct 22 and is directed downwardly toward the screens 20 by a plurality of arcuate turning vanes 24. Liquid foaming agent, which may comprise a mixture of water and detergent or other surface tension increasing bubble foaming wetting agent, is introduced into the upper end of the foam generation chamber 15 through a supply conduit 26 having a nozzle 28 at the lower end to provide a relatively uniform distribution of the liquid foaming agent onto the upper screens 20 in the stacked array.

As best shown in FIG. 2, the vertically stacked screens 20 are arranged with their openings in horizontally staggered relation so that the foam bubbles initially generated as the gas passes through the wetted screen cloth of the upper screens are subsequently divided and subdivided by the screen wires in the lower screens as the bubbles move downward. Any tendency of the bubbles to expand and enlarge is counteracted by the continuous dividing action of the staggered screens as the foam bubbles move downward. Moreover, a constant mesh size may be used, rather than requiring subsequent screens with smaller mesh openings to maintain a constant bubble size. The average bubble size of the foam being generated is thus maintained and kept small in order to provide an extremely high ratio of liquid film surface area per unit volume of gas being handled by the foam scrubber.

It is desirable to provide and maintain an extremely small average bubble size in the mass or column of foam sgenerated and moving through foam generation unit 12 from the upper to the lower end. In one prototype, in accordance with the invention, an average bubble size ranging from approximately 10 mils to 30 mils (0.010–0.030 inch) was achieved with screen mesh having eight openings to the inch. With an average bubble size of 10 mils, the ratio of liquid surface area per volume of gas entrapped thereby is approximately 8000 square feet per cubic foot, an extremely large wetting surface for collection of contaminants.

In a test conducted on a prototype scrubber 10, it has been found that a liquid foaming agent comprising a mixture of water and 2% "Triton X-100", a liquid detergent by Rohm & Haas Chemical Company produces good quality, relatively stable foam bubbles averaging in size from 10 to 20 mils (0.010–0.020 inch). Moreover, the foam is not destroyed by using average foam travel velocities as high as 130 feet per minute through the housing 15. It was also found that increasing the concentration or percentage of the liquid foaming chemical in the mixture generated good foam which could be maintained at higher average foam movement velocities up as high as 200 feet per minute. However, the higher velocities were obtained at an increased pressure drop through the housing and a tendency toward an increase in average bubble size resulted. Moreover, the tests also revealed that the pressure loss or energy required to generate the foam and move the foam through the housing increases with the number of screen layers used, increases with a reduction in the size of the screen mesh openings, increases with an increase of liquid foaming agent or detergent in the liquid mixture used for making foam and finally, increases as the rate of liquid supplied to produce foam is reduced. Foam densities of approximately ½pound per cubic foot are especially effective in providing high collection efficiencies with minimum water rates and energy requirements. The tests also showed that the type of foaming agent used and the type of screen mesh have an effect on the liquid required and pressure drop, believed to be related to the friction produced by the liquid film, foam bubbles moving over the surface of the strands of the screen cloth. Moreover, the diameter of the strands of the mesh and the wettability of the surface of the strands by the particular foaming agent used produce different pressure losses and liquid rates for given gas flow volumes. In addition, the wettability of the contaminant particles in the gas and the type of gas being cleaned are significant factors that effect the foam generation.

As illustrated in FIG. 2, the sprayed mixture of foaming chemical and water reaching the upper screens 20 forms a liquid film across the screen mesh openings and, as the gas flows downward, the liquid film is enveloped or wrapped around discrete volumes of the gas to form the gas filled foam bubbles much in the same manner that a child makes soap bubbles with soapy liquid by moving a ring through the liquid and then blowing on the liquid film on the ring. The entrapped or enveloped small, discrete volumes of gas in the liquid foam bubbles are subjected to repeated divisions and subdivisions as the foam moves through succeeding lower layers of screens 20 which are staggered as shown. The bubbles making up the foam are thus continually being divided, subdivided, etc., to maintain a selected average bubble size and thereby afford a maximum ratio between the liquid film surface area and each unit volume of gas being treated.

In accordance with the present invention, the screen layers 20 may be constructed of stainless steel, wire mesh, or "Nylon" mesh having eight openings per inch both ways and staggered as shown in FIG. 2. Forty to fifty screens, spaced approximately ¼ to 178 inch apart may be provided and an average foam movement velocity of 130 feet per minute through the screens will produce a relatively fine foam average bubble size (0.010 to 0.020 inch) at a pressure drop of approximately 12 inches of water measured between the upper and lower screens. With an average foam bubble size of 10 to 20 mils, a water rate or rate of foam producing scrubbing liquid supplied to the generator unit was about 60 gallons per thousand cubic feet of gas passing through the system. Very small size (less than 1 micron in diameter) magnesium oxide particles produced in an electric furnace were introduced into the gas flow and collection efficiency of 99.5% plus on the particles was achieved in the scrubber 10 operated under the conditions set forth. Extremely high collection efficiencies on small-size and difficult-to-collect impurities, such as electric furnace dust, are achieved with the foam scrubber of the present invention at an energy expenditure level just a little higher per unit volume of gas than with other scrubbers, some of which are not capable of collecting any appreciable percentage of particles in this size range.

FIG. 2 illustrated in somewhat animated fashion, how the foam bubbles are initially generated in the upper layers of the screens 20 and the process whereby a liquid film spanning the openings of the screen mesh in enveloped around the contaminated gas as the gas flows downwardly through the screen layers. The foam bubbles so formed are maintained at a desired small average bubble size by division and redivision as the foam passes downwardly in the housing through the staggered screen layers. The number, spacing, and mesh size of the screen 20 may be adjusted for different operating conditions to achieve and maintain an appropriate foam bubble size and prevent expansion of the bubbles to a larger size. As illustrated in FIG. 3 in somewhat animated fashion, the contaminated gas including small-size contaminant particles "A" is enveloped and entrapped in small discrete volumes within or inside the liquid foam bubbles "B" formed of thin liquid film. The gas inside the bubbles is stationary with respect to the bubble walls, although the entire mass of foam bubbles is moving through the system. The contaminant particles A are believed to move in random directions, as represented by the vectors, in accordance with Brownian theory, rather than as discrete physical particles. Accordingly, even the smallest, submicronic, contaminant particles A in the gas are not buoyed up by a moving gas stream and eventually strike or move at random into the surrounding liquid film of the bubble in a process of diffusion. The smaller, submicronic particles are thought to act more like molecules of a gas than as physical particles of finite mass and the small size of the bubbles provides an ample opportunity for these particles to contact the liquid and agglomerate therein as they become wetted. As the foam mass passes downwardly through the subsequent lower screen layers 20 in the housing 15, time is provided for the diffusion of the contaminants A into the liquid to take place, and by the time the foam bubbles reach the lower screens 20, the foam bubble size is relatively stabilized and does not tend to enlarge or shrink. During the period of time that elapses between initial formation of the foam bubbles and the final exit from the lower end of the housing 15, the contaminants in the small, discrete volumes of gas entrapped within the bubbles are afforded opportunity to diffuse and collect in the liquid film. Also, excess liquid and the heavier liquid containing agglomerated contaminants drains downwardly toward the lower end of the housing. At the lower end, the foam generator housing 15 is provided with a tapered reducer section 30 having an exit opening at the bottom connected to an inlet conduit 32 at the higher end of the elongated, sloped housing of the soaking unit 14.

The concentrated foam mass passes from the housing 15 through the inlet duct 32 into the higher end of a soaking chamber housing 34 which is sloped relative to the horizontal from the inlet end toward a discharge conduit 36 provided at the lower end. The chamber 34 is provided with a plurality of parallel, vertically spaced, divider trays 38 which provide a large surface area for the collection of liquid drained from the foam mass as it moves toward the lower end of the soaking chamber housing. The relatively large or extensive surface area of the trays aids in the precipitation and collection of the contaminated liquid from the moving foam mass. All of the excess liquid from the foam is drained off and collected on the trays and flows downwardly to collect in pools at the lower end. This liquid flows or spills over upstanding lips 39 at the end of the trays into a collection trough 40 around the discharge conduit 36. The liquid from the trough 40 passes out via a drain line 42 which delivers the liquid to a settlement tank (not shown) wherein the contaminants and sludge material collected from the gas are separated from the liquid foaming agent which is then reprocessed for continued use in the system. A method and apparatus for removing sludge and collected contaminants from the liquid is shown and described in copending U.S. patent application Ser. No. 82,644, filed Oct. 21, 1970, and reference should be had to this application for further details on the preparation of the scrubbing liquid for reuse in the apparatus 10.

As the foam passes slowly over the trays and down the elongated housing of the soaking unit 14, a soaking period or interval elapses, during which time the contaminants contained in the small, discrete volumes of gas that are entrapped or enveloped in the foam bubbles have ample opportunity to impinge upon and diffuse and collect in the surrounding liquid film of the foam bubbles. The contaminant-laden liquid is collected in pools at the end of the trays by the upstanding weirs or lips 39, and this collected liquid is separated from the foam via the collection trough 40 and discharge conduit 42.

During the time interval required for the foam mass to move through the soaking chamber 34, a considerable volume of the foam begins to break up or collapse, and this reduces the overall volume of foam delivered to or loaded on the foam breaker unit 16. The foam breaker 16 is a centrifugal type, mechanical foam breaker which employs a generally cylindrical housing 44 having an upright, cylindrical sidewall 46, a circular bottom wall 48, and circular top wall 50. The housing is supported on suitable structural framework 52 and encloses a rotating, high-speed, frustoconical, centrifuge bucket, generally indicated at 54, having an upwardly and outwardly sloping frustoconical sidewall 56 and a circular bottom wall 58. The centrifuge bucket 54 is mounted for rotation about a vertical axis in alignment with the axis of the outlet conduit 36 of the soaking chamber 34, and for this purpose a support shaft 60 is carried on a pair of bearings 62 and 64 supported on the frame structure 52. The circular bottom wall 58 of the bucket is attached to a flanged upper end of the shaft which is rotated at the desired high speed by an electric motor 66 through a belt drive 68. The bucket 54 is provided with a plurality of radial, outwardly extending ribs 70 mounted on the circular bottom wall 58, and a plurality of upstanding breaker ribs 72 are mounted on the inside surface of the frustoconical sidewall 56.

The mass of foam enters the housing 44 from the exit end of the soaking unit 14 and passes downwardly through a central feed chute 74 which is in aligned telescoping engagement with the discharge chute 36. The feed conduit 74 is axially aligned with the axis of rotation of the centrifuge bucket and terminates short of the bottom wall 58. Because of the relatively high speed of bucket rotation, centrifugal action causes the foam to be thrown outwardly against the bucket sidewall. The foam is impacted by the ribs 72 and 70 and the foam bubbles are mechanically collapsed by the centrifugal force acting on the denser liquid film. This causes the liquid to impinge on and collect on the sidewall 56. Because of the slope of the frustoconical sidewall 56 and centrifugal force, the liquid moves toward the upper edge of the bucket and then spills over into an annular, liquid collection trough defined inside the lower portion of the housing sidewall 46 and an upstanding, inner, annular wall 76 disposed around the lower portion of the centrifuge bucket. The liquid collected in the trough is returned to the settlement chamber through a drain conduit 78.

When the foam bubbles are collapsed by the centrifugal and impact action of the foam breaker 16, the cleansed gas released by collapse of the foam bubbles passes upwardly into the upper end of housing 44 through an enlarged opening provided in a horizontal, annular, baffle plate 80 which divides the housing 44 into a lower, bucket-enclosing chamber 82 and an upper, gas collection chamber 84. Cleansed gas collected in the chamber 84 is removed through a suitable exhaust stack 86 in a condition substantially free of pollutants.

the centrifugal bucket 54 is rotated at high speed and is able to handle a relatively large volume flow rate of foam bubbles. The foam breaker efficiently separates the foam into liquid and cleansed gas. The liquid is discharged from the liquid-collecting trough at the outer and lower portion of the housing 44 and the cleansed gas, freed by collapse of the foam bubbles, is collected in the upper chamber 84 and passes out through the exhaust conduit 86. It should be noted that because a considerable volume of excess liquid is removed from the foam while in the soaking chamber 34, a reduction in volume flow rate of foam results and this reduces the volume of foam which must be handled by the centrifugal foam breaker 16. This reduction lowers the amount of energy required per unit volume of gas handled and results in a highly economical foam scrubber operation. The particle and impurity removal efficiency of the foam scrubber system 10 has been found to be extremely high, especially in removal of gasious impurities and the extremely small-size particulate impurities (for example, particles of one micron and less in average dimension). It is believed that the production of foam bubbles with an average bubble size of 10 to 30 mils (0.010–0.030 inch) provides a desirable, high ratio of liquid film surface area per unit volume of gas. The soaking time, while the foam is traveling through the chamber 34, is adjustable by control of the foam volume flow rate and chamber size to obtain high collection efficiency of even the smallest size contaminant particles which are believed to act in accordance with the Brownian theory inside the foam bubbles in the diffusion process. A period or soaking interval of 5 to 12 seconds is usually enough to provide excellent collection efficiencies with foam densities of around ½ pound per cubic foot.

It also has been found in tests conducted on a prototype foam scrubber 10 that a design maximum pressure drop of 12 inches of water can be used efficiently with average foam velocity through the system of approximately 150 feet per minute. Moreover, because it has been found that the pressure drop decreases as the water rates are increased, it is desirable to effect a compromise between these factors in order to minimize operating costs. The foam scrubber unit 10 is useful with hydrocarbon liquid foaming agents utilized, rather than water, in applications wherein the moisture content in the cleansed gases is critical. suitable anhydrous foaming agents, such as Dow Corning Fluid "DC-2000", have been used with oil as a foam-producing scrubbing liquid, and this mixture has been found more effective for wetting and collecting some types of particulate matter and fumes than water or mixtures containing water. The scrubber 10 is well suited for using a variety of different foam-producing scrubbing liquids, including hydrocarbons, oils, and other chemical scrubbing agents in special industrial applications. For example, glycols and alcohols may be used as foaming agents, and these are effective in removing moisture from the gas being treated. Extremely good collection efficiencies have been achieved with a foam scrubber system 10 constructed in accordance with the invention. For example, efficiencies of 99.8% have been achieved in removing magnesium oxide particulate matter with particles of an average size of 3/10 to 5/10 of a micron and less. These efficiencies have been achieved with a total gas pressure drop in the system of 12 inches of water in comparison with venturi scrubbers which may require pressure drops in the order of 100 inches of water to achieve similar efficiencies. Moreover, in the foam scrubber 10, water rates of approximately 60 gallons of water per 1000 cubic feet of gas flow have been used with success. An average foam velocity of 130 feet per minute, using 50 screen stages spaced ¼ inch apart has been effective and it has been found that an average total transit time for a foam bubble to travel through the system, from generation to collapse, in the order of 10 to 12 seconds, has been sufficient to provide for full diffusion of the contaminants in the gas into the liquid film of the bubbles with a high particle collection efficiency.

Turning now, more particularly, to FIGS. 5 and 6, therein is illustrated a modified form of foam scrubber constructed in accordance with the features of the present invention and referred to generally by the reference numeral 110. The foam scrubber 110 also operates in accordance with the method of the present invention and employs a soaking unit 14 and foam breaker 16 substantially identical to the units of the scrubber system 10 as previously described. Accordingly, identical reference numerals will be used, and this description will describe only those portions of the scrubber system 110 which are different from the prior embodiment.

In accordance with the present invention, the foam scrubber 110 includes a modified foam generating unit 112 having an upright housing 114 with spaced apart, vertical sidewalls 116, a top wall 118 and bottom wall 120. contaminated gases to be cleaned are supplied to the lower end of the housing 114 through an inlet supply duct 122 and the gases are directed upwardly by a plurality of turning vanes 124. Liquid, foam-producing, scrubbing agent is directed upwardly from a supply conduit 126 and spray nozzle 128 onto the underside of a first foam bubble screen 130 which is supported in the housing in suitable fashion, for example, by an angle iron framework 132. Foam bubbles are initially formed or generated as the gas passes upwardly through the screen 130 in a manner similar to that previously described and as shown in animated form in FIG. 2 wherein the entrapped gases are enveloped or entrapped in liquid film which is wrapped around small, discrete volumes of gas to form foam bubbles of relatively small size. Excess liquid foaming agent passing beyond and above the first screen 130 and not used for bubble generation is removed through a liquid outlet opening or slot 116a formed in a sidewall 116 of the housing. The slot is in communication with a liquid collection chamber 134 having a discharge conduit 136 for returning the excess liquid back to a settlement tank, or the like (not shown), for eventual reuse in the system. This arrangement for initially removing any excess liquid foaming insures that an adequate supply of foaming liquid is provided for foam generation but reduces the amount of liquid required per unit volume of gas being put through the system by returning all excess liquid immediately after the foam generation process takes place. This results in a drier foam and lower operating costs because of the reduced water rate.

In accordance with the present invention, the foam scrubber 110 uses a modified foam generating and driving screen system which comprises a plurality of screen layers 140 formed of screen mesh having relatively large-size openings therein but with the mesh arranged in pleats in sort of an accordian style, as best shown in FIG. 6. Screens having mesh openings of approximately ½ inch square, or slightly less, have been used effectively to produce foam bubbles having an average diameter of 10 to 30 mils, and the pleated arrangement, while using large opening mesh, results in accurate control over bubble size with a greatly reduced pressure loss. The wider or larger openings in the screen mesh are arranged at acute angles with respect to the gas flow direction to provide small bubble size and good buzzle size control but with a much smaller pressure drop than that provided with screens having small openings. As shown in FIG. 5, several stages of pleated screens 140 are provided to divide and redivide the bubbles on their upward travel path and, adjacent the upper level of the housing 114, a plurality of additional flat screens 130 are provided to insure a small, average bubble size as the foam enters the soaking chamber 34 of the soaking unit.

The foam generating unit 112 produces high quality, stable foam with bubbles of controlled, small size (10 to 20 mils average size with foam velocities of 130 fpm), and operates at a much lower pressure drop between the inlet and outlet. Moreover, the water rate or rate of scrubbing liquid supplied to achieve a particular collection efficiency is reduced significantly because of the removal of excess liquid for the foam almost immediately after initial bubble generation.

The foam scrubber systems 10 and 110 of the present invention provide exceptional results in removing extremely high percentages of small size, difficult to remove contaminants from gas. Moreover, in accordance with the method of the invention, the gas is entrapped or enveloped in small, discrete volumes within a large liquid film surface area and is retained for a soaking period to provide for full diffusion of the contaminants into the liquid. The method affords an extremely high ratio of liquid surface area per unit volume of gas. Moreover, the method provides for using foam formed of non-aqueous liquid, such as oils and hydrocarbons to prevent and eliminate moisture from the gas. The use of hydrocarbon liquids rather than water has been found to be extremely efficient in removing greasy contaminants which are not readily wettable with water or water containing mixtures.

In accordance with another feature of the present invention, ammonia ($NH_3$) is introduced into the gases to be cleaned passing through the foam scrubber 10 and the ammonia reacts with the oxides of sulphur contained in the gas to form various compounds or combinations including ammonium sulphite [$(NH_4)_2SO_3$]. This material is believed to be a major ingredient in the objectionable visible plumes heretofore formed at the exhaust stack outlets of prior art wet scrubbing systems when ammonia was used in the wet scrubbing process. It is believed that the plume comprises minute, submicronic, ammonium-sulphite particles having particles sized down to ⅓ of a micron of an inch and smaller in major dimension. This extremely particle small size is believed to contribute to the difficulty in removal of the particles from the gas even though the material itself is soluble in water.

It has been found that the foam scrubbing method and apparatus of the present invention is highly effective in removal of these plume forming particles at a much lower cost than heretofore possible in prior art scrubbers. For example, tests utilizing air at 70°F as the carrier gas with sulphur dioxide $SO_2$ and ammonia $NH_3$ introduced in equal amounts to a total of 500 PPM (parts per million) has required an operating pressure drop of 70 inches of water in a venturi type wet scrubber in order to remove the visible plume from the exhuast. The venturi scrubber utilized in the tests was constructed like the scrubber shown in copending U.S. patent application Ser. No. 91,854, filed Nov. 23, 1970 and the pressure drop was measured between the inlet opening 16 and the outlet opening 30.

The scrubbing apparatus 10 of the present invention was tested with identical test gas comprising air at 70°F with ammonia gas ($NH_3$) injected therein at the ratio of 250 PPM and sulphur dioxide gas ($SO_2$) at the ratio of 250 PPM. On the first run the test gas was passed through the foam scrubber 10 with no foaming agent added to the scrubbing liquid which comprised water. The foam scrubber was operated at a pressure drop of 14 inches of water measured between the inlet duct 22 and the foam outlet duct 36 leading to the foam breaker or separator 16. A visual plume formed of ammonium sulphite particles was present at the exhaust stack of the scrubber 86. In the next test run, the foam scrubber 10 was operated at an identical pressure drop of 14 inches of water and with identical test gas (70°F air with $SO_2$ and $NH_3$ of 250 PPM each) but instead of using water alone as the scrubbing liquid, a mixture of water and liquid foaming agent comprising "Triton X-100" liquid detergent was utilized. During the test run the visible plume was eliminated completely from the exhaust stack. In both test runs the outlet area of the exhaust stack was well illuminated, and in the first run with no foaming agent the usual white appearing plume was present while in the second run with a liquid foaming agent in the scrubbing liquid no visible plume was present. The foregoing tests firmly establish that objectionable constituents such as sulphur dioxide ($SO_2$) can be effectively removed from industrial gas in accordance with the method and apparatus of the present invention at a fraction of the cost required in prior art wet scrubbers. The power required on the foam scrubber 10 of the present invention operating at a pressure drop of 14 inches of water is substantially lower per cubic foot of gas treated than heretofore possible with venturi type wet scrubbers which require much higher pressure drops in the range of 70 inches of water to approximate the same result.

In addition to the tests described many other tests have been run on the foam scrubber 10 of the present invention utilizing a test gas having electric arc furnace dust introduced therein in precisely controlled amounts. Particle size distribution on the electric arc furnace dust show that more than 50% of the particles are sized below ½ micron of an inch and 70% of the particles are below 1 micron in size. In preparing the dust for festing, the dust is collected in a filter from the exhaust stack of an electric furnace and is then thoroughly dried to drive off all moisture. The dried dust is passed through a high speed hammer mill (10,000 RPM) having an outlet screen with openings of 0.025 inches therein. The test dust is introduced into the gas flowing into the flam scrubber inlet duct 22 in controlled amounts per unit time. Exhaust gas from the stack 86 is carefully sampled in accordance with the test procedure outlined and specified by a bulletin published by the "Industrial Gas Cleaning Institute" entitled "Test Procedures for Gas Scrubbers, Wet Collection Division". The procedures are also outlined in "Report No. 177, Instructions for Sampling Particulates", by Frank Ekman, copyrighted 1968, National Dust Collector Corp. and revised in Sept. 1971. In these specified test procedures, dust sampling is accomplished using glass fibre filter paper, Gelman Type E which is rated to have a particle removal efficiency of 99.7% for dioctyl phlhalate droplets down to 0.3 microns in size. For all practical purposes this type of filer is close to an absolute filter for particulates.

In tests run on the foam scrubber 10 using the electric arc furnace test dust in varying amounts, removal efficiencies of greater than 99.9% were achieved. In 30 min. test runs, only a slight discoloration of the outlet sample paper was present and no particulate matter was discernible with a light microscope. Operating pressures during the runs were varied from 14 to 27 inches of water with no discernible change in the efficiency of collection. Tests with the same test dust and dust loading per cubic foot of gas in prior art venturi scrubbers have required operating pressures of 65 inches of water or better to achieve similar collection efficiencies.

Other tests with the foam scrubber 10 indicate excellent characteristics for absorbtion processes wherein noxious impurities in gaseous form are removed from the stack gas being scrubbed. Nitric oxide is a difficult gas to remove from common stack gases, and other oxides of nitrogen are also difficult to remove. Generally, oxides of nitrogen even in relatively low concentrations are potential health hazard and many attempts have been made to remove these gases on an economical cost basis.

In tests run with the foam scrubber 10, concentrations of nitric oxide of approximately 1000 PPM were introduced in the scrubber and removal efficiencies of 32 to 38% were achieved while operating in the pressure drop range of 14 to 27 inches of water. Both inlet and outlet samples were taken and the test for nitric oxide was the Phenoldisulphonic Acid Method. The test results compare very favorably to efficiency of 15 to 18% nitric oxide removal in conventional nitric oxide absorder towers operated at the same range in pressure drop.

The new and improved method and apparatus for wet scrubbing industrial gases of the present invention which employ a mass of liquid foam bubbles of small size for soaking the gas within the foam bubbles for a selected time or soak period has proved extremely effective and efficient in the removal of many hard to collect gas contaminants and pollutants. The present invention provides methods and apparatus which are economically sound and lower in cost than heretofore though possible.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Apparatus for removing contaminants from a flowing gas stream comprising foam generator means for entrapping small discrete volumes of said gas within liquid film enclosures forming a mass of foam bubbles, said foam generator means including perforated means for supporting a film of liquid foaming material and forming said film into discrete bubbles filled with said gas moving through the perforations therein, said perforated means comprising a perforated member having formed pleats therein arranged with surfaces angularly intersecting said moving gas flow; sizing means for successively reforming said bubbles into smaller bubbles for maintaining a stable mass of small bubbles; soak chamber means for containing said mass of foam bubbles for movement away from said sizing means during a substantial soaking period ofor diffusion and collection of contaminants from said gas into said liquid film of the bubble walls; and foam breaker means receiving bubbles from said mass in soak chamber means for collapsing said foam bubbles to separate cleansed gas and contaminated liquid of said bubble walls.

2. The apparatus of claim 1 wherein said sizing means comprises a plurality of perforated members in successive downstream spaced-apart relation from said generator means for successive reformation of the bubbles into smaller ones upon passage through said perforated members.

3. The apparatus of claim 1 wherein said sizing means comprises a perforated member downstream in the direction of gas flow of said perforated means of said foam generator means.

4. the apparatus of claim 1 wherein said pleated perforated member includes perforations therein substantially larger than the transverse area of said discrete volumes of gas.

5. The apparatus of claim 1 wherein said soak chamber means includes an elongated housing having a foam inlet adjacent said sizing means at one end and a foam outlet adjacent said breaker means at the other end.

6. The apparatus of claim 5 including a plurality of liquid collecting trays mounted in said chamber and sloped downwardly from one end toward said other end for collecting liquid draining from said mass of foam as it flows toward said outlet.

7. The apparatus of claim 6 including liquid collecting means adjacent said foam outlet for receiving liquid from said collecting trays.

8. The apparatus of claim 7 wherein said trays are mounted in spaced-apart parallel relation extending longitudinally of said chamber, and lip means on the end of said trays for pooling liquid collected thereon for delivery to said liquid collecting means.

9. The apparatus of claim 1 wherein said foam generator includes a housing and a first perforated member mounted across the path of flowing gas in said housing upstream of said pleated perforated member, and means for spraying liquid foaming agent toward an upstream side of said first perforated member forming foam bubbles as said gas passes through the perforations therein.

* * * * *